March 30, 1926.
F. M. CASE
FISHING REEL
Original Filed Nov. 19, 1921    3 Sheets-Sheet 1
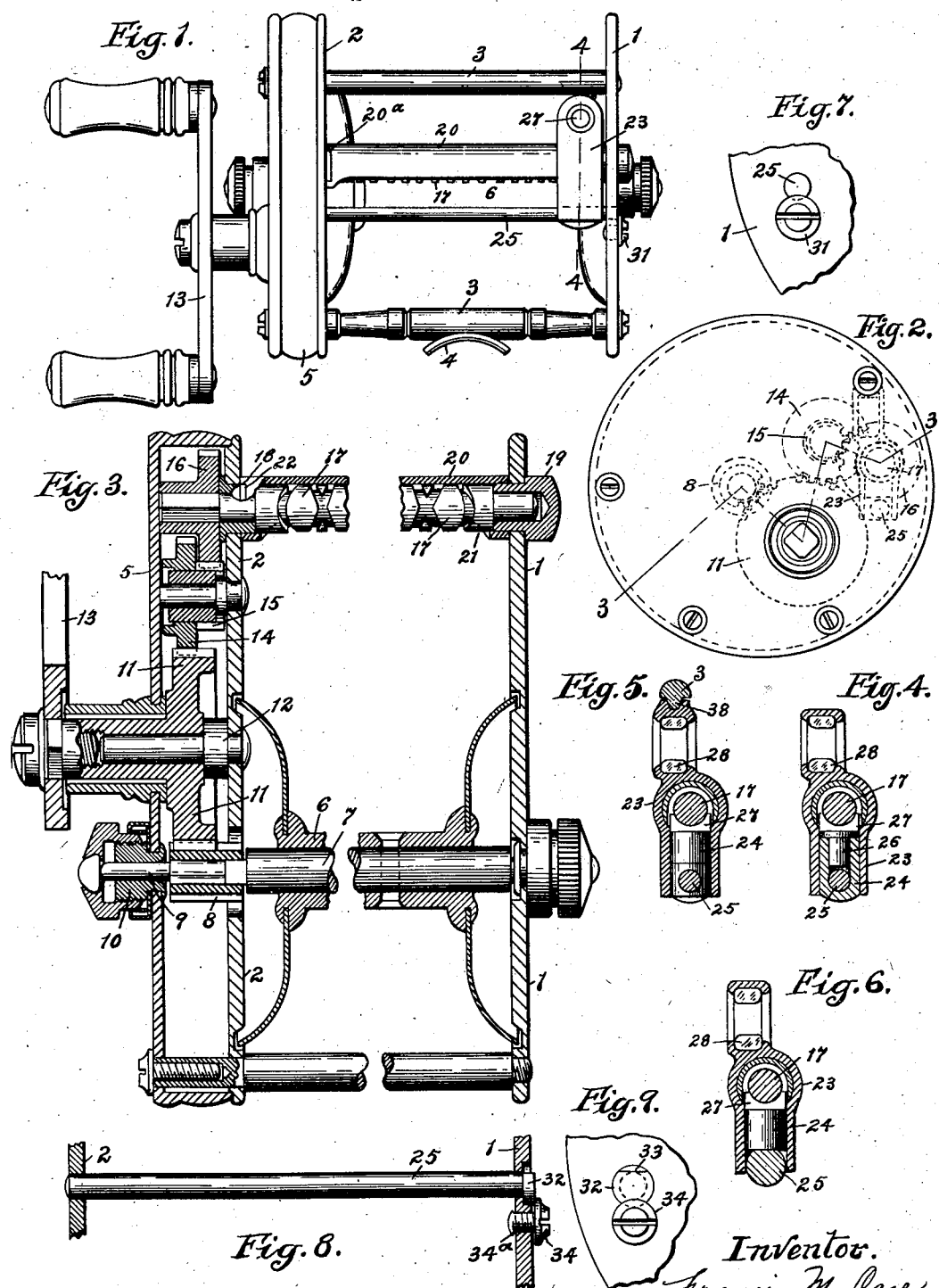

March 30, 1926.
F. M. CASE
FISHING REEL
Original Filed Nov. 19, 1921   3 Sheets-Sheet 2
1,579,076
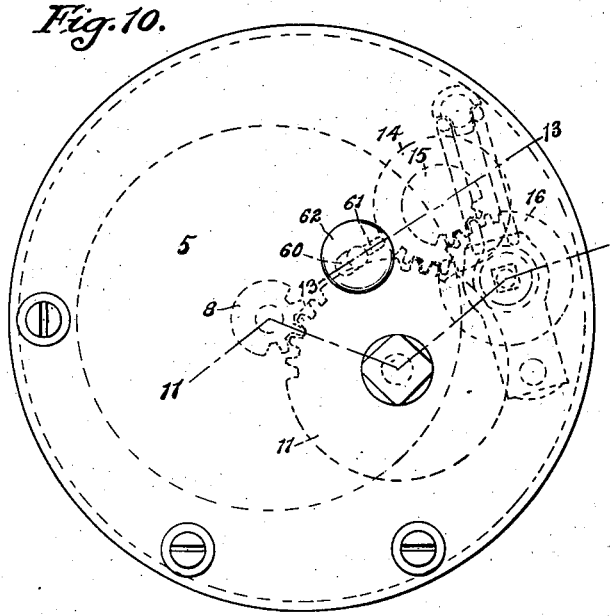
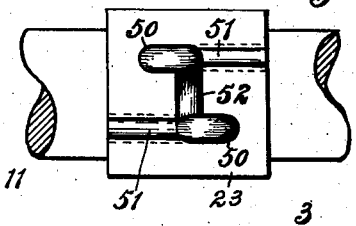
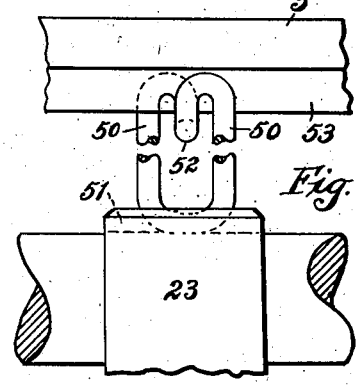
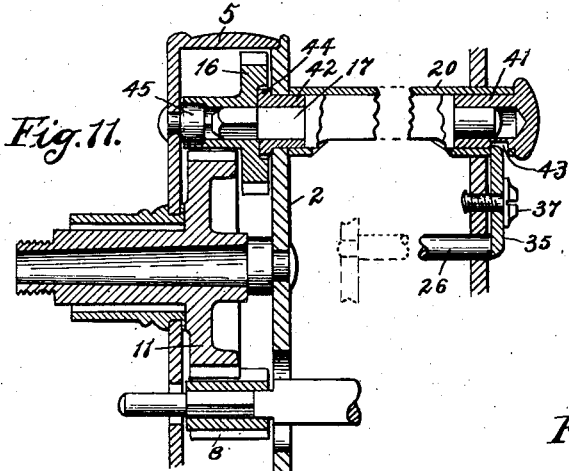
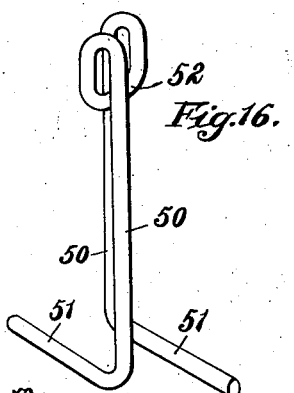
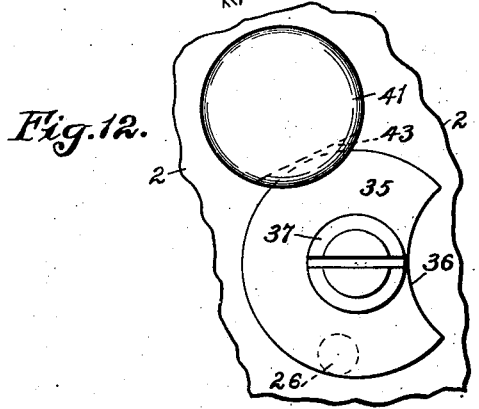
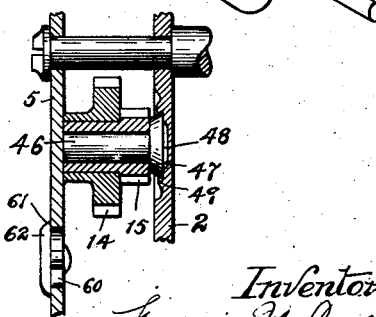
Inventor.
Francis M. Case
By Brockett & Hyde
Attys.

March 30, 1926. 1,579,076
F. M. CASE
FISHING REEL
Original Filed Nov. 19, 1921  3 Sheets-Sheet 3
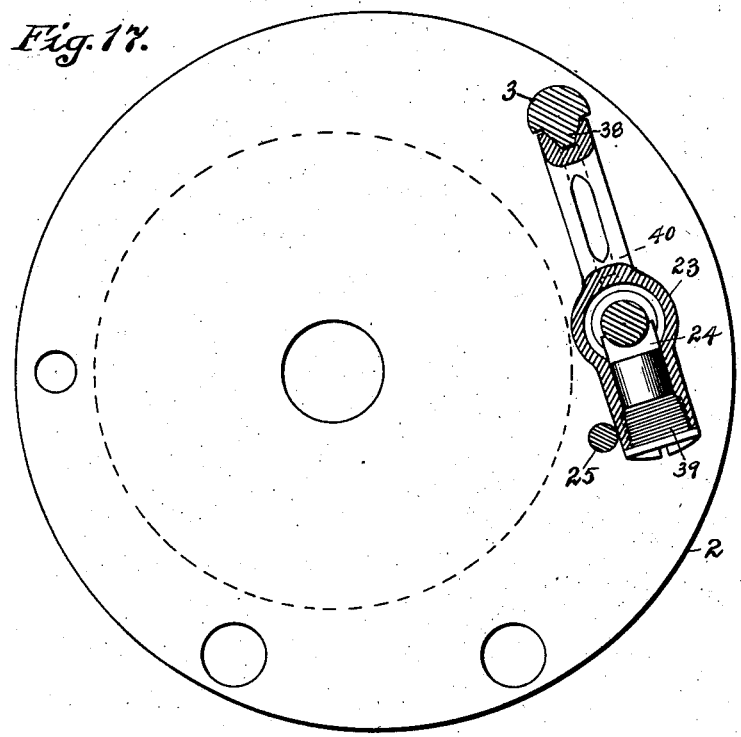
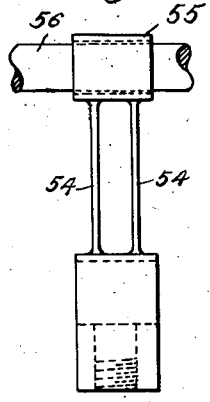
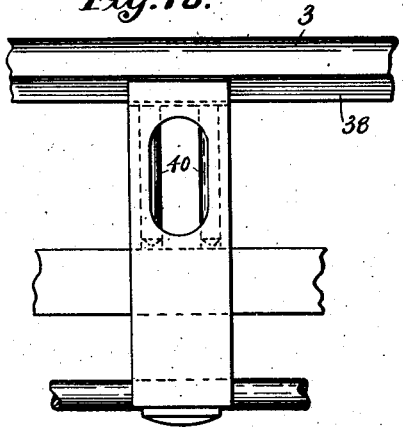
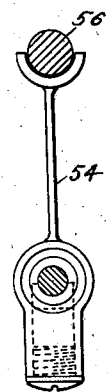
Inventor.
Francis M. Case
By Brockett & Hyde
Attys.

Patented Mar. 30, 1926.

1,579,076

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING REEL.

Application filed November 19, 1921, Serial No. 516,407. Renewed December 10, 1925.

*To all whom it may concern:*

Be it known that I, FRANCIS M. CASE, a citizen of the United States, residing at Cleveland, in the county of Cuyahoga and State of Ohio, have invented certain new and useful Improvements in Fishing Reels, of which the following is a specification.

This invention relates to fishing reels and more particularly to the level wind mechanism for distributing the line evenly upon the rotating spool.

The objects of the invention are to generally simplify and improve the level wind mechanism and the driving means therefor; to steady and support the traveling line guide member during its reciprocating movement; to protect the reversely threaded shaft by a surrounding sleeve and improve and strengthen said sleeve and its connection to the end plates; to provide a reel in which the level wind mechanism, including the threaded shaft, its protecting casing and the traveling line guide member may be readily removed for cleaning or repairing without entirely disassembling the reel and particularly without disturbing the end plates; to provide a removable steadying device for the line guide member which may also serve to confine in place the traveling pawl on the reversely threaded shaft; and finally to generally improve the construction of the line guide member and other parts of the reel.

Further objects of the invention are in part obvious and in part will appear more in detail hereinafter.

The invention comprises the construction and arrangement of parts hereinafter described and claimed.

In the drawings Fig. 1 is a front elevation of one form of reel embodying the invention; Fig. 2 is a side elevation from the left in Fig. 1, the operating handle being omitted; Fig. 3 is a mutilated section on approximately the line 3—3, Fig. 2, this section being taken to show the entire train of driving gears; Fig. 4 is a detail section on the line 4—4, Fig. 1; Figs. 5 and 6 are similar views showing modified arrangements of the lower steadying bar, Fig. 5 also showing an additional upper steady bar; Fig. 7 is a detail end elevation from the right in Fig. 1, illustrating one arrangement for removably holding the lower steadying bar in place; Figs. 8 and 9 are respectively a detail longitudinal section and an end elevation showing another arrangement for the same purpose; Fig. 10 is an end elevation corresponding to Fig. 2 and illustrating another embodiment of the invention; Fig. 11 is a detail section on the line 11—11, Fig. 10; Fig. 12 is an enlarged detail end view from the right in Fig. 11; Fig. 13 is a detail section on the line 13—13, Fig. 10; Figs. 14 and 15 are respectively a front elevation and a plan view of the line guide member shown in Fig. 10; Fig. 16 is a perspective view of the wire portion thereof; Fig. 17 is a detail view showing another arrangement of line guide member and steadying bars therefor; Fig. 18 is a front view thereof; Fig. 19 is a detail front view of another line guide; and Fig. 20 is a cross section of still another form thereof.

The fishing reel shown in the drawings comprises the usual frame including end plates 1, 2 connected by pillars 3, two of which carry a curved plate 4 for attachment to the fishing rod. Beyond one of said end plates is a casing or cap 5 to enclose or protect the driving gearing for the spool 6 having a shaft 7. Said shaft extends through an opening in the end plate 2 and is provided with a reduced portion having rotatable therewith the pinion 8 beyond which the shaft is still further reduced at 9 and is supported by a bearing member 10 carried by the cap or casing. The pinion 8 is driven by a large gear 11 rotatable on a stub shaft 12 and having a sleeve portion to which the operating handle is connected. The same driving gear 11 drives an intermediate gear member consisting of a large gear 14 rotating with another smaller gear 15 which drives a pinion 16 having a non-circular, such as a square opening, to receive the reduced similarly shaped end of a reversely threaded shaft 17. Said shaft opposite the pinion end turns in a bushing 19 driven into an opening in plate 1.

Surrounding the reversely threaded shaft is a protecting sleeve or casing 20 cut away on one side to form a longitudinally extending slot or opening 21, the metal at the ends of said slot being left untouched to leave a complete cylinder at each end and thereby reinforce the casing. To prevent rotation of the sleeve or casings its pinion end is slotted across transversely to fit a flattened portion of the bushing 22, as shown at 20ª.

The slot or opening 21 in sleeve 20 exposes the reverse threads of said shaft and enables driving connection to be established between said shaft and the line guide member. Said line guide member is shown in Figs. 1 and 4 as comprising a metal block 23 sleeved and sliding upon the sleeve or casing 20. The lower portion of said guide member has a vertically extending opening to receive a short tube or thimble 24 which is confined in the block by a bar 25 which also serves to steady the movement of the traveling guide and prevent it from cocking or binding. In said tube 24 is located the shank 26 of a pawl 27 which rotates about a vertical axis and follows the threads back and forth in the traveling movement of the guide member which has an eye 28 through which the line passes and which eye may be surrounded by an agate or other hardened piece if desired.

Figs. 5 and 6 show other arrangements of steady bars for steadying the traveling guide member and also confining the pawl in place. For example, in Fig. 5 the bar 25 passes through an opening in a block 29 pushed into the bottom of the guide member and on which the pawl rests and turns. In Fig. 6 the steady bar 25 lies directly below the pawl instead of passing through a block beneath said pawl as in Fig. 5. Other arrangements are suitable for the same purpose.

In these forms of the invention the steady bar is made readily removable in order that the pawl can be easily taken out from the guide member without disassembling the entire reel or disturbing its end plates. Any suitable arrangement may be used for this purpose. As shown in Figs. 1 and 7 the bar 25 is pushed into place through an opening in the end plate 1 and the plain end of the bar, when in place, is partly covered by the head of a removable screw 31. By taking out this screw the bar 25 can be slid out endwise through the opening in plate 1, after which the pawl and pawl holding parts can be taken out through the bottom of the guide member. In Figs. 8 and 9 the steady bar 25 has a head 32 one side of which is flattened, as at 33, and the edge of which head is overlapped by the head of a screw 34. By partly releasing this screw and turning the steady bar until its flattened portion 33 registers with the screw head the bar can be removed endwise. With this arrangement the inner end of the screw can be slightly mushroomed, as at 34ª, so that it can not be wholly removed or lost. Figs. 11 and 12 show another arrangement in which the plain end of the steady bar 25 is overlapped by a washer 35 having a side recess 36 and held beneath the screw head 37. This washer can be turned to release the steady bar. It has also another function to be later described. In any event any ready releasable means for the steady bar may be used with any form of steady bar or pawl confining devices.

The traveling line guide member may be also steadied at its upper end as well as at its lower end, or the lower steady bar may be omitted. For example, in Fig. 5 the upper end of the line guide member is recessed to receive a longitudinal rib 38 on the lower portion of one of the pillars 3. A similar arrangement is found in Figs. 17 and 18. In this latter form, also, the steady bar 25 is at one side of the lower portion of the line guide member and merely serves to prevent the line from wrapping around the lower end of the same, as in the other forms described, but does not confine the pawl, which is held in place by a screw 39 threaded into the lower end of the guide member. In this case also the eye for the line is an elongated slot or opening the side edges of which are formed by metal pins 40 embedded in the body of the line guide. These pins may be of hardened steel, tungsten steel or any other suitable material for the purpose. The pins are usually inserted endwise into place in openings bored in the guide member. When the pillar along which the upper end of the line guide travels is of special cross sectional shape, as in Figs. 5 and 17, the ends of said pillar enter similarly shaped openings in the end plates to prevent rotation of the pillar.

Figs. 10 to 16, inclusive, show another embodiment of the invention. In this case the general arrangement of the driving gearing is the same as before described. The chief feature of this device is the removability of the reversely threaded shaft and its sleeve so that the entire level wind mechanism can be taken out without disassembling the reel or disturbing its end plates. The sleeve 20 surrounding the reversely threaded shaft is fastened at one end to a bearing member 41 for one end of said shaft. At its opposite end said sleeve is non-rotatably supported as before by a bushing 42 driven into the end plate 2. Sleeve 20 and the member 41 at one side are provided with a recess 43 to receive an edge of the washer 35 before referred to. Consequently, by turning the washer 35 until its recess registers with the sleeve 20 not only the steady bar 26 but also the entire sleeve and threaded shaft may be pulled out endwise from the reel, it, of course, being assumed that the pawl has been freed from the reversely threaded shaft by either removing the screw 39, as in Fig. 17, or by taking out the steady bar in case the latter serves to hold the pawl in place, as in Figs. 4, 5 and 6.

In this form also the pinion 16 which has driving connection with the threaded shaft surrounds at one end a collar 44 of bushing 42 and at its opposite end is sleeved upon a stub shaft 45 riveted to the cap or casing 5. Pinion 16 will therefore not become displaced or dislodged when the level wind mechanism is taken apart. Also, the intermediate gear member which completes the driving chain between the main gear 11 and pinion 16, and which is shown in Fig. 13, is sleeved upon a stub shaft 46 having a head 47 of reversely tapered form which is introduced into a counter sunk recess 48 in the outer surface of end plate 2, the metal around said recess being afterwards peened or rolled inwardly, as at 49, to hold the shaft in place. With this arrangement both the pinion 16 and the intermediate gear 14, 15 are confined and held between the end plate 2 and the outer wall of the cap 5.

This form of the invention also includes a special form of line guide eye. This eye is formed of a piece of wire bent to form two vertically extending portions 50 the lower free ends 51 of which are bent into parallel horizontal relation and are imbedded in recesses in the upper end of the traveling block and secured thereto by soldering or the like, and the upper ends of which are joined by a bent U-portion 52 which receives the rib 53 on the steady bar or pillar as shown in Figs. 10 and 14. With this arrangement the two vertical wire portions 50 are spaced apart horizontally both lengthwise of the spool and in a plane perpendicular to its axis so that the effective distance between said rods and therefore the effective opening of the eye is greater than the apparent opening when the reel is viewed from the front. Traverse of the line back and forth when winding is not interfered with but a larger opening is secured when the line runs out as in casting. At the same time a simple guiding and steadying effect is secured by the bent U at the upper end of the eye embracing the pillar, this also preventing the line from wrapping around the guide.

Fig. 19 shows another arrangement in which the side wires 54 of the line guide eye support a small sleeve 55 which surrounds and slides on the upper pillar 56, while in Fig. 20 said sleeve is of semi-cylindrical form and merely embraces the lower portion of the pillar.

As shown in Figs. 10 and 13 the cap or gear casing 5 may also be provided with a slot 60 having a reduced portion 61 and in which slot slides the shank of a button 62. This button can be slid back and forth to cover or expose the reduced slot portion 61 which serves as an oiling opening for the gears.

It will of course be understood that any form of reel shown may embody any form of the line guide shown in the drawings and the same reel may also include any form of steady bar, either one serving to confine and lock the pawl in place, as in Figs. 4, 5, 6 and 10, or a steady bar at one side of the line guide as in Fig. 17. This same form of reel may also include a fully removable level wind mechanism as in Fig. 11 or the form shown in Fig. 3, where complete disassembling necessitates separation of the end plates.

What I claim is:

1. A fishing reel, comprising a frame including end plates, one of which has an opening, a rotatable spool, a travelling line guide, and a bar along which said guide slides, said bar being located within the confines of the frame and in alignment with said opening and being removable from the reel by movement in one direction.

2. A fishing reel, comprising a frame including end plates, one of which has an opening, a rotatable spool, a travelling line guide, and a bar along which said guide slides, said bar being located within the confines of the frame and in alignment with said opening and being removable from the reel by movement through said opening.

3. A fishing reel, comprising a frame including end plates, one of which has an opening, a rotatable spool, a travelling line guide, and a bar along which said guide slides, said bar being located within the confines of the frame and in alignment with said opening and being removable from the reel without disturbing said frame.

4. A fishing reel, comprising a frame including end plates, one of which has an opening, a rotatable spool, a travelling line guide, a bar along which said guide slides, said bar being located within the confines of the frame and in alignment with said opening and being removable from the reel through said opening without disturbing said frame, and means located at one end of said bar for holding the same in place.

5. A fishing reel, comprising a frame including end plates, one of which has an opening, a rotatable spool, a travelling line guide, a bar along which said guide slides, said bar being located within the confines of the frame and in alignment with said opening and being removable from the reel through said opening without disturbing said frame, and means movably mounted upon one of said end plates for removably confining said bar in place.

6. A fishing reel, comprising a frame including end plates, a rotatable spool, a reversely threaded shaft, a travelling line guide carriage having a pawl movable back and forth along said shaft, a bar along which said carriage slides and which confines the pawl thereof in said carriage, said bar being located within the confines of the frame and being removable from the reel without disturbing said frame, and means for normally preventing the removal of said bar.

7. A fishing reel, comprising a frame including end plates, a rotatable spool, a reversely threaded shaft, a travelling line guide carriage having a pawl movable back and forth along said shaft, a bar along which said carriage slides and which confines the pawl thereof in said carriage, said bar being located within the confines of the frame and being removable from the reel without disturbing said frame, and means engaging the end of said bar for normally preventing its removal from the reel.

8. A fishing reel, including a frame and level wind mechanism mounted within the confines of the frame and embodying a rotatable reversely threaded shaft and a line guide member movable along the same, said reversely threaded shaft being so mounted as to permit removal thereof without disassembling the frame.

9. A fishing reel, comprising end plates, a rotatable spool, level wind mechanism including a rotatable shaft located within the confines of said end plates, and line guiding means operated thereby, said shaft being mounted for removal thereof without disturbing the end plates.

10. A fishing reel, comprising end plates, a rotatable spool, a reversely threaded shaft located within the confines of said end plates, a line guide member actuated thereby, and means whereby said reversely threaded shaft may be removed without disturbing the end plates.

11. A fishing reel, comprising end plates, a rotatable spool, a reversely threaded shaft located within the confines of said end plates, and a line guide member actuated thereby, said reversely threaded shaft being removable through an opening in one of said end plates.

12. A fishing reel, comprising end plates, a rotatable spool, a reversely threaded shaft located within the confines of said end plates, a travelling line guide member actuated thereby, and a protecting member surrounding said shaft and lying between said end plates, said protecting member being readily removable without disturbing the end plates.

13. A fishing reel, comprising end plates, a rotatable spool, a reversely threaded shaft, a traveling line guide member actuated thereby, and a protecting member surrounding said shaft, said shaft and protecting member being removable through an opening in one of said end plates.

14. A fishing reel, comprising end plates, a rotatable spool, a threaded shaft, a line guide member actuated thereby, and a bar along which said line guide member travels, said shaft and bar being both located within the confines of said end plates and being removable without disturbing the end plates.

15. A fishing reel, comprising end plates, a rotatable spool, a threaded shaft, a line guide member actuated thereby, and a bar along which said line guide member travels, said shaft and bar being each removable through an opening in an end plate.

16. A fishing reel, comprising end plates, a rotatable spool, a threaded shaft, a line guide member actuated thereby, a bar along which said line guide member travels, said shaft and bar being each removable through an opening in an end plate, and means on an end plate normally confining said bar and shaft in place and adjustable to permit removal of the same.

17. A fishing reel, comprising end plates, a rotatable spool, a threaded shaft, a line guide member actuated thereby, a bar along which said line guide member travels, said shaft and bar being each removable through an opening in an end plate, and a locking member carried by an end plate and serving to normally confine both said bar and shaft in place.

18. A fishing reel, comprising end plates, a rotatable spool, a threaded shaft, a line guide member actuated thereby, a bar along which said line guide member travels, said shaft and bar being each removable through an opening in an end plate, and a locking member carried by an end plate and serving to normally confine both said bar and shaft in place and adjustable to permit removal of either therefrom.

19. A fishing reel, comprising end plates, a rotatable spool rotatable between the same, a threaded shaft, a line guide member movable along the same, a pawl carried by said member and engaging the threads of said shaft, and a bar along which said member slides and arranged to confine said pawl in place, said bar and shaft being readily removable without disturbing the end plates.

20. A fishing reel, comprising end plates, a rotatable spool, a threaded shaft, a line guide member movable along the same, a pawl carried by said member and engaging the threads of said shaft, a bar along which said member slides and arranged to confine said pawl in place, said bar and shaft being readily removable without disturbing the end plates, and a removable sleeve on which said guide member slides.

21. A fishing reel, comprising end plates, a rotatable spool, a reversely threaded shaft, a sleeve surrounding the same of full cylindrical form at both ends and between said ends having a slotted portion exposing the shaft threads, a line guide member sliding on said sleeve and having a pawl engaging the shaft threads through said slot, and a bushing mounted in one of said end heads and having a non-circular portion receiving a like portion of said sleeve for preventing rotation thereof.

22. In a fishing reel, the combination of end plates, a rotatable spool, a reversely threaded shaft, a line guide member actuated thereby, a gear casing attached to one of said end plates, gears therein for driving said spool and shaft, and opposed means on said casing and the adjoining end plate and normally engaging the sides of said gear for confining one of the gears in its proper axial position.

23. In a fishing reel, the combination of end plates, a rotatable spool, a reversely threaded shaft, a line guide member actuated thereby, a gear casing attached to one of said end plates, gears therein for driving said spool and shaft, and means on said casing and the adjoining end plate for confining the several gears in their respective axial positions, said reversely threaded shaft being removable from the reel without disturbing the end plates or the gears.

24. A fishing reel, comprising end plates, a rotatable spool, a traveling line guide member, said member including a block, wire members extending upwardly therefrom and connected by a U-shaped portion, and a bar between the end plates embraced by said U-shaped portion.

25. A fishing reel, comprising end plates, a rotatable spool, a traveling line guide member, said member including a block, wire members extending upwardly therefrom and connected by a U-shaped portion, and a bar between the end plates embraced by said U-shaped portion, said wire members being spaced apart transversely of the spool axis.

26. A fishing reel, comprising a frame, a rotatable spool, and line guiding means therefor, including a carriage movable back and forth along said spool and provided with opposed parallel members adapted to confine the line therebetween, said members being off-set from each other both longitudinally and transversely of the spool axis.

27. A fishing reel, comprising a frame provided with a gear casing, operating gears therein, an operating shaft cooperating with one of said gears and separable therefrom by relative axial movement, and means for confining said cooperating gear in place when said shaft is separated therefrom.

28. A fishing reel, comprising a frame including end plates, a rotatable spool, a reversely threaded shaft, a travelling line guide member actuated thereby, and a protecting member surrounding said shaft and removable from the reel through an opening in one of said end plates.

29. A fishing reel, comprising end plates, a rotatable spool, a reversely threaded shaft, a travelling line guide member actuated thereby, and a protecting member surrounding said shaft, and removable from the reel without disturbing said end plates.

30. In a fishing reel, the combination with a frame comprising head and tail members and connecting pillars therefor, of a spool, a traversing shaft, a carriage slide rod disposed parallel to said traversing shaft, said head member having a socket for said slide rod, said tail member having an opening through which said slide rod may be introduced to said socket, a line guide carriage slidable on said rod and provided with a pawl co-acting with said shaft, a line guide member on said carriage, and a retaining member for said rod secured to said tail member.

31. In a fishing reel, the combination with a frame comprising a tail member having a traversing shaft bearing thereon and an opening therein through which a carriage slide rod may be introduced, of a spool, a traversing shaft disposed in said bearing, a carriage slide rod disposed in said opening, a line guide carriage slidable on said rod and having an opening through which said rod may be introduced longitudinally and provided with a pawl co-acting with said shaft, and a retaining member for said rod secured to said tail member to obstruct said opening thereof.

32. In a fishing reel, the combination with a frame comprising a tail member having a traversing shaft bearing thereon and an opening therein through which a carriage slide rod may be introduced, of a spool, a traversing shaft disposed in said bearing, a carriage slide rod disposed in said opening, a line guide carriage slidable on said rod and provided with a pawl co-acting with said shaft, and a retaining member for said rod secured to said tail member to obstruct said opening thereof.

In testimony whereof I hereby affix my signature.

FRANCIS M. CASE.